United States Patent
Chen et al.

(10) Patent No.: US 10,228,680 B2
(45) Date of Patent: Mar. 12, 2019

(54) AUTONOMOUS PERFORMANCE OPTIMIZATION IN ROBOTIC ASSEMBLY PROCESS

(71) Applicant: Texas State University, San Marcos, TX (US)

(72) Inventors: Heping Chen, Austin, TX (US); Hongtai Cheng, Liaoning (CN)

(73) Assignee: Texas State University, San Marcos, TX (US)

( * ) Notice: Subject to any disclaimer, the term of this patent is extended or adjusted under 35 U.S.C. 154(b) by 298 days.

(21) Appl. No.: 14/907,119

(22) PCT Filed: Jul. 22, 2014

(86) PCT No.: PCT/US2014/047631
§ 371 (c)(1),
(2) Date: May 18, 2016

(87) PCT Pub. No.: WO2015/013283
PCT Pub. Date: Jan. 29, 2015

(65) Prior Publication Data
US 2016/0187874 A1   Jun. 30, 2016

Related U.S. Application Data

(60) Provisional application No. 61/958,163, filed on Jul. 22, 2013.

(51) Int. Cl.
*G05B 19/4155* (2006.01)
*G06Q 10/04* (2012.01)
*G06Q 50/04* (2012.01)

(52) U.S. Cl.
CPC ......... *G05B 19/4155* (2013.01); *G06Q 10/04* (2013.01); *G06Q 50/04* (2013.01);
(Continued)

(58) Field of Classification Search
CPC ...... G05B 19/4155; G05B 2219/39371; G05B 2219/31368; G06Q 10/04; G06Q 50/04; Y02P 90/30
See application file for complete search history.

(56) References Cited

U.S. PATENT DOCUMENTS 7,065,420 B1 * 6/2006 Philpott ................. G06Q 30/02
700/97
8,032,337 B2 * 10/2011 Deichmann ............. A61F 11/08
345/419

(Continued)

FOREIGN PATENT DOCUMENTS

WO   2015013283   1/2015

OTHER PUBLICATIONS

Cheng, Hongtai et al. "Online Parameter Optimization in Robotic Force Controlled Assembly Processes" 2014 IEEE International Conference on Robotics & Automation (ICRA), Hong Kong Convention and Exhibition Center May 31-Jun. 7, 2014.

(Continued)

*Primary Examiner* — Charles R Kasenge
(74) *Attorney, Agent, or Firm* — Meyertons, Hood, Kivlin, Kowert & Goetzel, P.C.; Mark R. DeLuca

(57) ABSTRACT

A method for process parameter optimization in a robotic manufacturing process includes identifying, in two or more successive iterations, a system model for the robotic manufacturing process. Manufacturing process parameters are optimized based on the model identified. The process may be a robotic assembly process.

15 Claims, 11 Drawing Sheets

(52) U.S. Cl.
CPC .............. *G05B 2219/31368* (2013.01); *G05B 2219/39371* (2013.01); *Y02P 90/30* (2015.11)

(56) References Cited

U.S. PATENT DOCUMENTS

| | | | | |
|---|---|---|---|---|
| 8,032,343 | B2* | 10/2011 | Cai | B23K 11/11 703/7 |
| 8,266,940 | B2* | 9/2012 | Riemeier | A61C 7/20 72/306 |
| 8,386,080 | B2* | 2/2013 | Bosscher | B25J 9/1676 700/245 |
| 8,527,091 | B2* | 9/2013 | Bosscher | B25J 9/1676 700/245 |
| 8,571,706 | B2* | 10/2013 | Zhang | G05B 19/41885 700/245 |
| 9,101,769 | B2* | 8/2015 | Edgerton | A61N 1/0551 |
| 9,434,072 | B2* | 9/2016 | Buehler | B25J 9/0087 |
| 9,858,529 | B2* | 1/2018 | Adams | G06N 7/005 |
| 2008/0125893 | A1 | 5/2008 | Tilove et al. | |
| 2009/0150126 | A1* | 6/2009 | Sellamanickam | G06N 7/005 703/2 |
| 2010/0174514 | A1* | 7/2010 | Melkumyan | G06F 17/18 703/2 |
| 2010/0241248 | A1* | 9/2010 | Zhang | G05B 19/41885 700/29 |
| 2012/0179635 | A1* | 7/2012 | Vasudevan | G06F 17/18 706/12 |
| 2012/0324406 | A1 | 12/2012 | DeMaris et al. | |
| 2013/0151008 | A1* | 6/2013 | Bosscher | B25J 9/1676 700/248 |
| 2014/0121820 | A1* | 5/2014 | Das | G05B 13/04 700/182 |
| 2014/0298343 | A1* | 10/2014 | Rajan | G06F 9/5027 718/102 |

OTHER PUBLICATIONS

International Search Report and Written Opinion for PCT International Application No. PCT/US2014/047631 to Chen et al, dated Apr. 6, 2015.
International Preliminary Report on Patentability for PCT International Application No. PCT/US2014/047631 to Chen et al, dated Jan. 26, 2016.

* cited by examiner

AUTONOMOUS PERFORMANCE OPTIMIZATION IN ROBOTIC ASSEMBLY PROCESS

BACKGROUND

Field

The present disclosure relates generally to methods for controlling automated manufacturing processes. More particularly, aspects of the present disclosure relate to systems and methods for optimizing performance of robotic assembly processes.

Description of the Related Art

Over the years, shifting manufacturing requirements to high flexibility, short production cycle time and high throughput have urged the emerging of intelligent manufacturing systems. Conventional industrial robots have high repeatability, but may lack adaptivity and flexibility. In manufacturing processes, the environment is constantly changing and parts/components to be processed could come from different batches and sometimes different suppliers. All of these variations will cause difficulty for conventional industrial robots to perform many manufacturing processes (for example, a converter assembly in the power train assembly process).

For example, in a typical assembly process, the clearance and geometry of parts from different batches, sometime different suppliers, are different. These variations will cause the increase of cycle time. Steps are sometimes taken to tune the assembly process parameters to adapt to the variations. However, it is difficult to tune all the parameters since the relationship between the parameters and system performance is not clear.

For example, installing a valve into a valve body is not always as easy as it looks. The radius of the valve is about 24.96 mm while the radius of the hole in the valve body is 25.00 mm with a clearance about 40 µm. Because of the fixture errors, the valve cannot be aligned with the holes on the valve body exactly. Therefore, the valve can be stuck at the surface of the valve body due to the positioning errors or jammed in the middle of the valve body due to the orientation errors. Thus several parameters are involved in this assembly process, such as search force, search speed, search radius and insertion force. The assembly process performance will decrease if these parameters are not tuned correctly to adapt to the variations.

Due to the demanding requirements of modern manufacturing and the limitations of conventional industrial robots, intensive human labors have been made in robot programming, teaching and parameter tuning/optimization etc. Several offline algorithms have been proposed to solve the assembly process parameter optimization problem. The Genetic algorithms (GA) are developed to randomly search for optimal parameters. To increase the efficiency of the GA based methods, Artificial Neural Network (ANN) may be utilized to model whether the parameters are "good" or "bad" to filter the candidate parameters first without performing any experiment. Design-of experiment (DOE) methods adopt a systematic way to optimize the parameters. After performing a series of experiments, the most sensitive parameters are chosen and tuned carefully. Even though these methods may be effective in offline parameter optimization, it may be unreasonable or unfeasible to use them online because of their low efficiency. Moreover, because the assembly processes typically have many stages and different control strategies such as hopping and searching, it may be difficult to construct a physical model to optimize the process parameters.

In many cases, the performance of a robotic assembly process is measured by the assembly cycle time and First-Time-Through (FTT) rate. Real-time assembly data may be used to construct an initial motion model. State-of-the-art robots may require an operator to manually modify parameters of the assembly process when they do not meet the requirements to satisfactorily complete the intended operation. In a typical process, the robot must be stopped (taken offline) and process parameter modifications made. This becomes a mitigated process with each failure to complete the assembly, updated again and again until satisfactorily completed. Subsequently, when the assembly model parameters have been defined, process cycle optimization and the FTT rate is again worked out by the human operator using the same iterative manual steps as before.

SUMMARY

Systems and methods for optimizing performance of manufacturing processes, such as robotic assembly processes, are described. In an embodiment, a method for process parameter optimization in a robotic manufacturing process includes identifying, in two or more successive iterations, a system model for the robotic manufacturing process. Manufacturing process parameters are optimized based on the model identified. For at least one of the iterations, optimization may be performed and applied to the manufacturing process on-line while the manufacturing process is being performed. In some embodiments, the process is a robotic assembly process. In some embodiments, the model is identified using a Gaussian regression process.

In an embodiment, system includes a processor and a memory coupled to the processor and configured to store program instructions executable by the processor to implement a method a method for process parameter optimization in a robotic manufacturing process includes identifying, in two or more successive iterations, a system model for the robotic manufacturing process. Manufacturing process parameters are optimized based on the model identified.

In an embodiment, a tangible, computer readable medium includes program instructions are computer-executable to implement a method for process parameter optimization in a robotic manufacturing process includes identifying, in two or more successive iterations, a system model for the robotic manufacturing process. Manufacturing process parameters are optimized based on the model identified.

In an embodiment, a method for process parameter optimization in a process includes identifying, in two or more successive iterations, a system model for a process. For each of at least two of the iterations, one or more process parameters based on the model identified for that iteration. For at least one of the iterations, a switching criterion is applied to determine whether to perform exploitation or exploration.

In some embodiments, a method of controlling a manufacturing process includes performing a Gaussian process regression to model a relationship between process parameters and system performance of a manufacturing process. A manufacturing process is controlled based on the model. In certain embodiments, a random variation is applied to perform a parameter optimization online of a robotic assembly process. The process parameters may be optimized by way of GPRBOA to reduce the cycle time by balancing exploration and exploitation processes.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In some embodiments, a system iteratively identifies system model using the Gaussian regression process and optimizes the assembly parameters based on the identified model. The assembly process parameters may be re-optimized when there are system disturbances and/or part variations. In some embodiments, a system performs an online parameter optimization without using any physical model and/or without human involvement.

In some embodiments, a system identifies a model for robotic assembly process, and optimizes parameters of the process to improve the performance such as the cycle time and First Time Through (FTT) rate without stopping a production line. A model is constructed using the assembly data (which may be real-time assembly data) and updated step by step. The updated model is used to generate a new set of parameters to perform the assembly process. The process may be continued until a set of optimal parameters is obtained. The set of parameters is used to perform the assembly process. Once there is disturbance in the process, the cycle time and FTT rate may change. At this point, the optimization process may be started again to optimize the parameters.

In certain embodiments, a Gaussian Process Regression surrogated Bayesian Optimization Algorithm (GPRBOA) iteratively models a complex system and optimize the system performance. In some embodiments, GPRBOA is used to model an assembly process and optimize the process parameters online. Candidate parameters are applied online without stopping an assembly line to perform experiments for parameter optimization. A Gaussian Process Regression (GPR) may address noisy observations and system uncertainties.

In certain embodiments, a GPRBOA algorithm employing random variation is applied perform a parameter optimization online in a robotic assembly process. The process parameters may be optimized by way of GPRBOA to reduce the cycle time by balancing exploration and exploitation processes.

Figure 1:
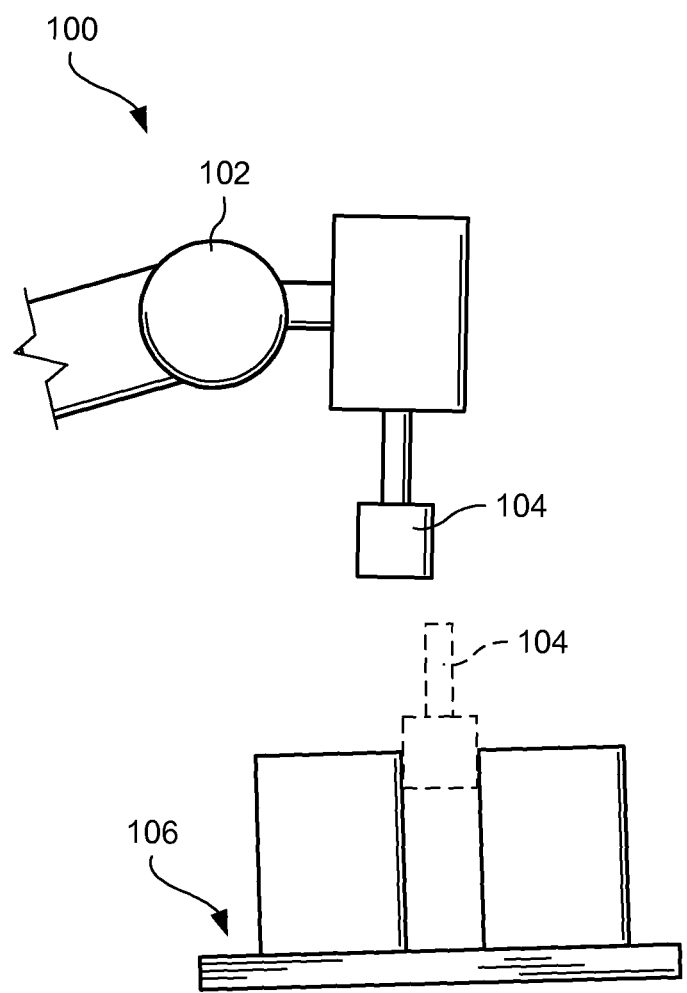
FIG. 1 shows a robotic system to perform a high precision peg-in-hole assembly process.

In some embodiments, a robotic assembly includes a force sensor, a robot tool holding a part and a workpiece on a fixture. A high precision robotic assembly requires a robot to perform assemblies in which the assembly clearance is close to or better than the robots' repeatability. FIG. 1 shows a robotic system to perform a high precision peg-in-hole assembly process. Robotic system 100 includes robot tool 102. Robot tool 102 picks up a part 104 and assembles it into the workpiece 106. During the assembly process, the robot searches the location of the hole on the workpiece and applies a certain force to insert the part into the workpiece while adjusting the part orientation. Thus there are several parameters involved in the process. In various embodiments, one or more parameters are tuned and/or optimized in order to optimize the system performance.

Figure 2:
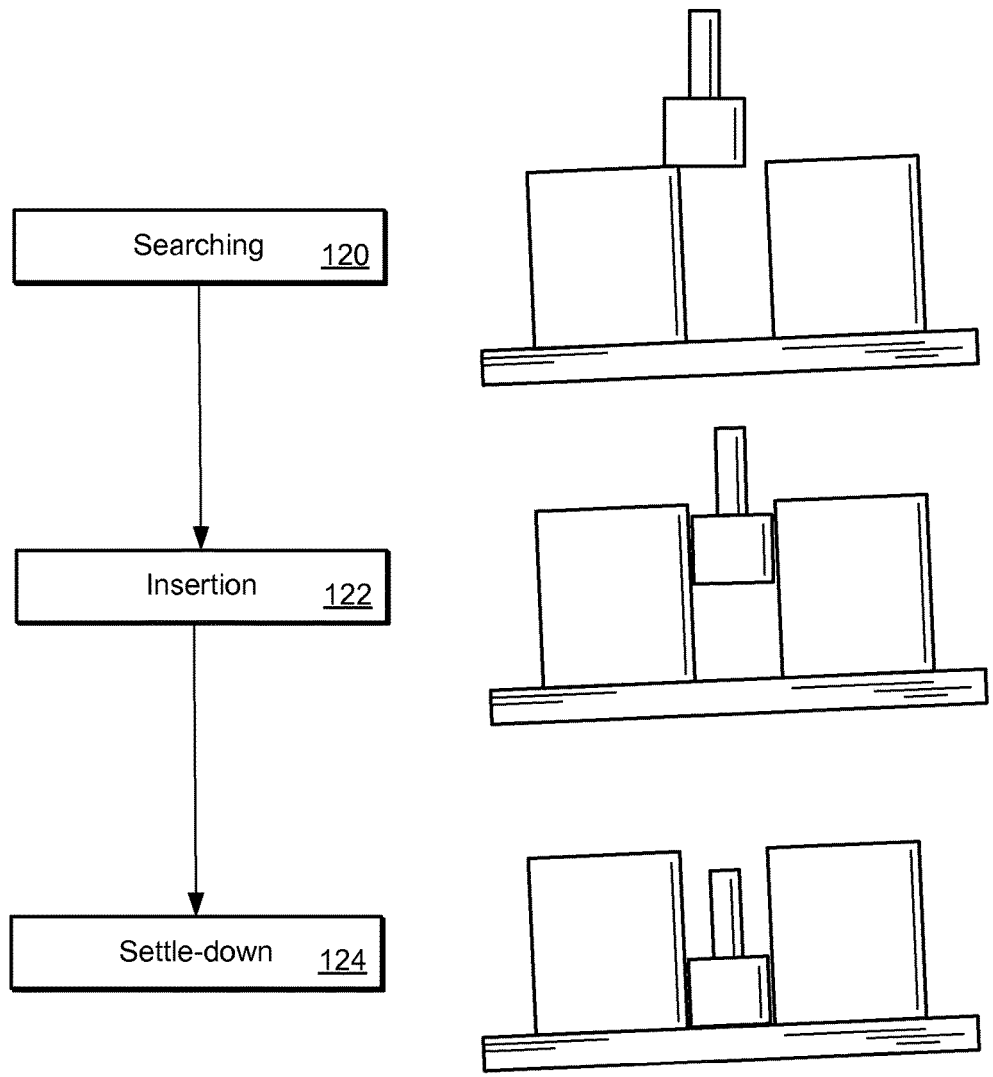
FIG. 2 shows the steps to perform the assembly process.

FIG. 2 shows the steps to perform the assembly process. A searching method is used to find the exact location of the workpiece at 120. After the part is engaged with the workpiece, an insertion force is applied at 122 to insert the part into the workpiece. During insertion, the tool orientation may be changed according to the orientation of the workpiece to avoid jam at 124.

Figure 3:
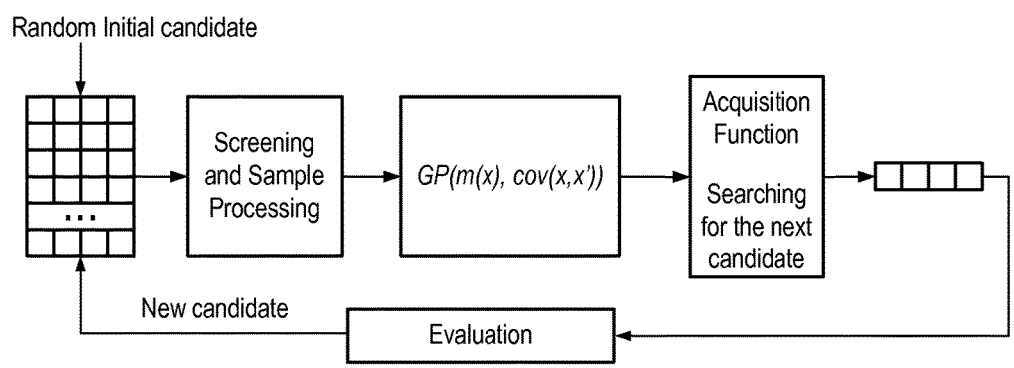
FIG. 3 illustrates a parameter optimization process according to one embodiment.

FIG. 3 illustrates a parameter optimization process according to one embodiment. The robotic assembly system performs an assembly process using the initial set of parameters and the results, for example, cycle time, are recorded. Based on the recorded data and the Gaussian process regression method, the model is updated. Using the updated model, a new set of parameter candidates to be used to perform the assembly process is identified using an optimization method. The process is repeated until a set threshold is satisfied.

Figure 4:
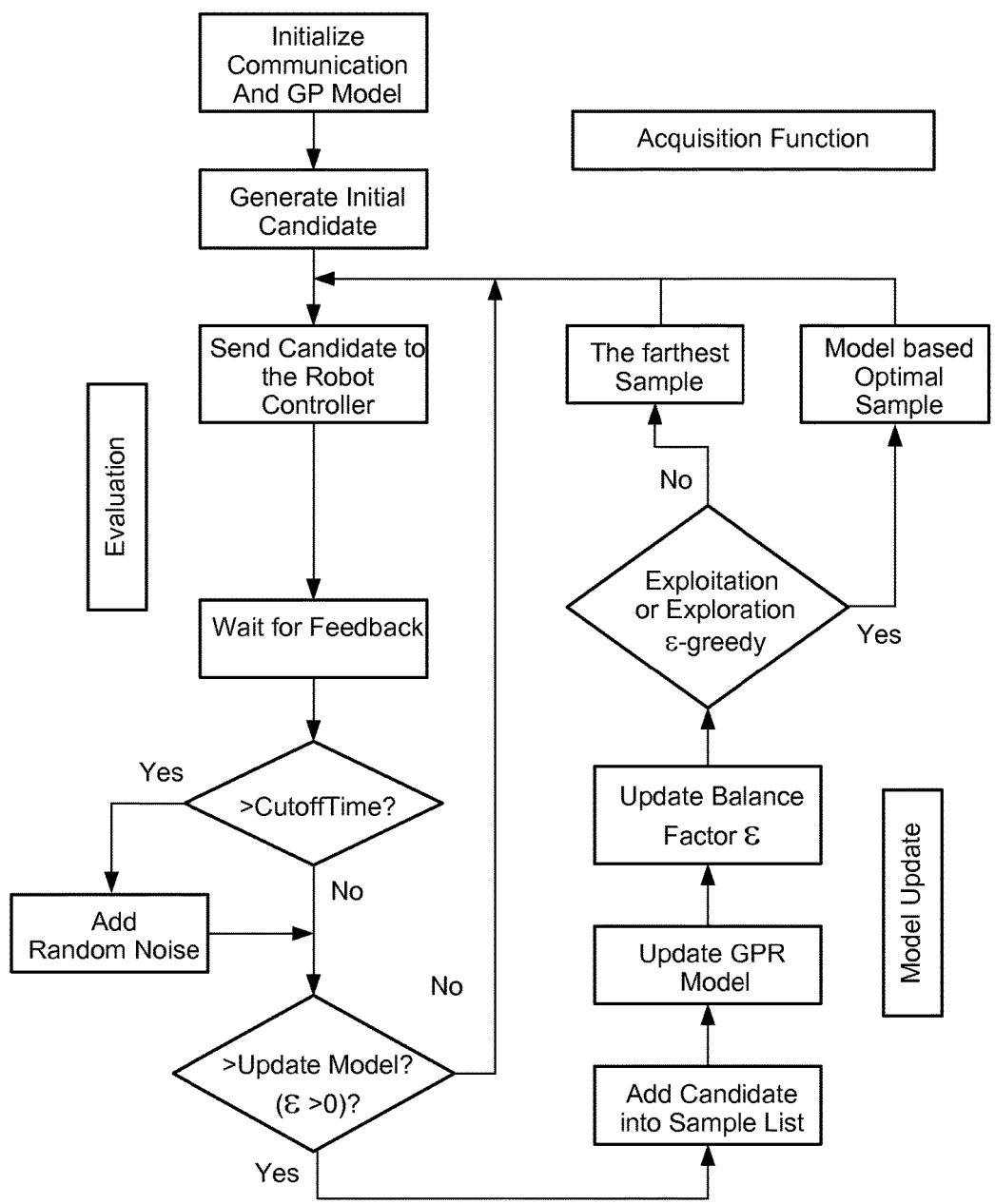
FIG. 4 illustrates a parameter optimization process according to one embodiment.

FIG. 4 illustrates a parameter optimization process according to one embodiment. This example includes three main parts: evaluation, model update and acquisition function generation. In the evaluation part, the robot performs an assembly process using a set of candidate parameters. If the assembly time is larger than the cut-off time, the assembly process will stop and a failure assembly is recorded. Since the total assembly time is unknown in this case, a random time is added. If the assembly process is successful, the assembly time is recorded. The following method may then be used to update the model:

$$\begin{bmatrix} y \\ f_* \end{bmatrix} \sim N \left( 0, \begin{bmatrix} K(X,X) + \sigma_n^2 I & K(X,X_*) \\ K(X_*,X) & K(X_*,X_*) \end{bmatrix} \right)$$

$$\overline{f}_* \triangleq E[f_* \mid X, y, X_*] = K(X_*, X) K(X, X)^{-1} y \quad\quad 5$$

$$V(\overline{f}_*) = K(X_*, X_*) - K(X_*, X) K(X, X)^{-1} K(X, X_*)$$

Where (X,y) are a data set; X* is the desired data set; f* is the latent function; K(X,X') is the covariance matrix.

After the system model is updated, new parameter candidate has to be determined. As used herein, the "acquisition function" is the function used to generate new sample from the updated model. When it is assumed that the objective function f(x) is sampled from a GPR, a combination of the posterior predictive mean μ and variance σ may be used to construct acquisition function, which may be used to determine where to sample next.

For this parameter learning algorithm (which may be referred to herein as a "GPRBOA" parameter learning algorithm), one new sample added into the sample set because the assembly process is performed one by one. Therefore, if the prior information is not accurate enough (i.e., little information is available about the initial value of the hyperparameters), the GPR may not able to generate an accurate model and thus cannot output enough information for the later Bayesian optimizing process. This is quite different from the general purpose GPR modeling problem where enough sample data have been provided and the hyperparameters can be optimized with high accuracy. Therefore, the acquisition function should balance the optimization and the model generation problem. The algorithm may rely heavily on the underlying GPR model. In some embodiments, a parameter ϵ is introduced to control the purpose of the next sample point. The acquisition function is:

$$UCBVR(x) = \begin{cases} \mu(x) + \kappa \cdot \sigma(x) & rand(1) > \varepsilon \\ \max_{x \in \chi} \min_{i \in 1 \ldots N} [d(x - x_i)] & \text{otherwise} \end{cases}$$

where d(x-x') is a metric characterizing the distance between two points x and x'. During each iteration, a random number Rand(1)(0<Rand(1)<1) is generated. If Rand(1)>ϵ, the next point is selected to optimizing the target function, otherwise, it is selected to improve the model. The variable c can be changed according to the changes of hyperparameters and system performance. Once the model is mature, ϵ is close to 0, which means all the sample points are devoted to optimize the target function.

The optimization process may be restarted once there is a disturbance. The following criteria may be used to initiate the optimization process:

$$\Delta w = \frac{|w_k - w_{k-1}|}{|w_k - w_0|}$$

where $\omega_k$ is the hyperparameter of GPR in iteration k. When the model converges, the hyperparameter changes little and thus, Δw is close to 0. Furthermore, we denote the system performance as Ct, there are $$\varepsilon = \begin{cases} 1 & \Delta w > 1 \\ 0 & \Delta w < 0.05, C_t < C_t^* / k_u \\ 0.5 & \Delta w < 0.05, C_t > C_t^* / k_l \\ \Delta w & \text{otherwise} \end{cases}$$

where $k_u$, $k_l$ are two constants controlling the termination condition and restart condition. Here the variable ϵ is the same one as the one in the UCBVR acquisition function. It is used to control the next sample point: whether it is computed using the model based optimization or it is obtained randomly. When the model has great uncertainty, e.g. Δw>1, ϵ is set to 1 which enables the program to sample randomly. When the termination conditions are satisfied, ϵ is set to 0 and the program will generate a set of optimal parameters and stop updating the GPR model. When the restart condition is satisfied, ϵ is set to 0.5 to restart the optimization process.

Some techniques for optimization that may be used in certain embodiments include Conjuncted Gradient Algorithm, evolutionary algorithms, or Nelder-Mead (Simplex) method. In certain embodiments, a Bayesian Optimization Algorithm (BOA) estimates a probability distribution of promising solutions using Bayesian Network (BN) in order to generate new candidate solutions. The BN model may be updated at each iteration using new samples. In some case, the BOA may achieve a good balance between the modeling difficulty and parameter optimization efficiency.

In some embodiments, a GPR surrogated BOA (GPR-BOA) is implemented. The algorithm may iteratively model a complex system and optimize the system performance. In each iteration, new samples may be added into the existing data set and used to update the GPR model. The new GPR model may be used to search for the optimal solutions by maximizing a performance index s(x) (also known as the acquisition function) over the input domain. Because the acquisition function controls the new sample points, it directly affects the quality of the built model and the optimal solution. Typically the acquisition function defined using μ(x) and σ(x) is deployed to acquire a new candidate using different techniques such as Probability of Improvement, Expected Improvement and Lower Confidence Bound (LCB). With LCB, lower confidence bounds (upper, when considering maximization) may be exploited to increase the optimization efficiency. LCB may have the form:

$$LCB(x) \triangleq \mu(x) - \kappa \cdot \sigma(x) \quad\quad (9)$$

where κ is a scaling factor. Instead of only sampling the points with minimum mean μ(x) or maximum variance σ(x) predicted using the current model to improve the model uncertainty, LCB may reduce the search space by combining the mean with variance, which can ignore points that has no possibility of being optimal.

Figure 5:
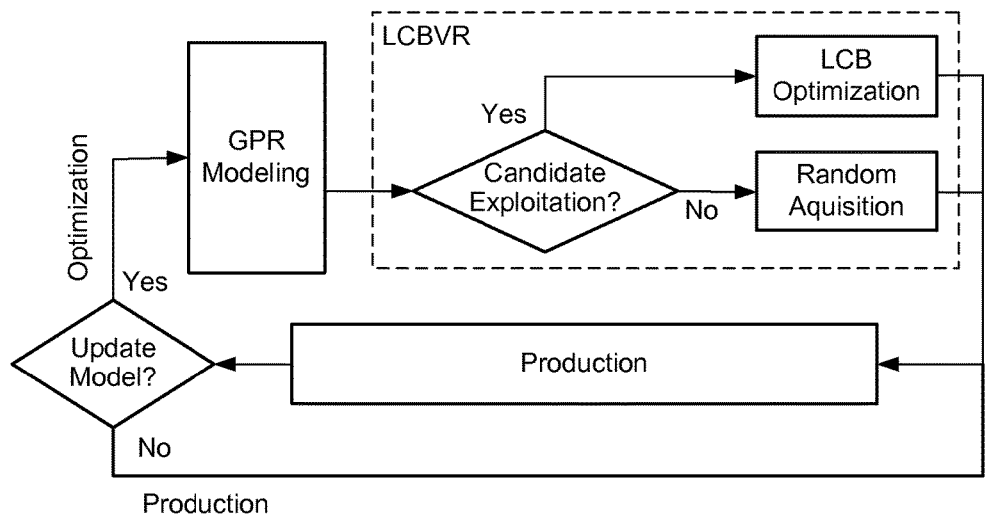
FIG. 5 illustrates one embodiment of a GPRBOA algorithm with random variation.

In some embodiments, a GPRBOA algorithm with random variation is implemented to optimize system parameters. FIG. 5 illustrates one embodiment of a GPRBOA algorithm with random variation. There are four blocks within the diagram: GPR modeling, new candidate parameter generation, production/evaluation and switching criterions determination. LCBVR represents Lower Confidence Bound Variation Random. Optimization and production loops may be integrated to adapt to the process variations and dynamically optimize the assembly process parameters. The algorithm starts from an initial set of parameter candidates and searches for the optimal parameters iteratively. Once a set of optimal parameters is found, the system switches to the production loop and perform the assembly task repeatedly. Meanwhile the system performance is monitored continuously. And once it decreases, the optimization process is restarted and the above processes repeated.

In various embodiments, deploying GPRBOA online may address difficulties from the following two aspects: the variations of the assembly process and computational burden of GPR.

1) Variations of the Assembly Process: GPRBOA performs online modeling and optimization simultaneously using the exploration and exploitation processes. If the exploration and exploitation processes are not properly balanced, the optimization process can be trapped in local minima. The LCB method can explore a system by sampling x with large $\mu(x)$ and exploit the model by sampling x with large $\sigma(x)$. Hence it requires prior information about the variance of cycle time. However, for different batches or assembly processes, such prior information is not available. To deal with such a problem, a method, such as described in FIG. 4, may balance the exploration and exploitation processes:

$$x^* = \begin{cases} \text{argmin} LCB(x) & rand(1) > \varepsilon \\ \text{argmax} VR(x) & \text{otherwise} \end{cases} \quad (10)$$

where $\varepsilon$ is the performance index which is updated online according to the hyperparameters and system performance as shown in equation (12); VR(x)(Variation Random) is a random acquisition function used to explore the unsampled area to improve the model quality by investigating the farthest unsampled points:

$$VR(x) = \min_{i \in 1 \ldots N} [d(x - x_i)] \quad (11)$$

where d(x-x') is the distance between two sets of parameters x and x'. At each iteration, if rand(1)>$\varepsilon$, the new candidate is optimized by exploiting the current model; otherwise, it is calculated by exploring the unsampled parameter space. Hence the exploitation process optimizes the process parameters according to the constructed GPR model while the exploration process refines the model according to random variation.

2) Computational Complexity of GPR: The computational complexity of GPR is proportional to $O(N^3)$ where N is the number of samples. When N becomes bigger, the computational complexity will increase greatly. Therefore, the optimization process should be terminated once the model becomes stable and the optimal parameters are identified. Meanwhile, if the assembly performance decreases, the optimization process should be restarted to re-optimize the assembly process parameters. Hence a new switching method is proposed to control the parameter optimization process:

$$\varepsilon = \begin{cases} 1 & \Delta\theta > 1 \\ 0 & \Delta\theta < k_\theta, C_t < C_t^*/k_u \\ 0.5 & \Delta\theta < k_\theta, C_t > C_t^*/k_l \\ \Delta\theta & \text{otherwise} \end{cases} \quad (12)$$

where $k_u$, $k_l$ are two constants controlling the optimization process; $k_\theta$ is the threshold to determine if a model is converged; $C_t$ is the current cycle time and $C_t^*$ is the best cycle time so far; $\Delta\theta = |\theta_k - \theta_{k-1}|/|\theta_k - \theta_0|$ is the normalized change of hyperparameters, where $\theta_k$ is the hyperparameters at iteration k. When a model is converged, $\Delta\theta \to 0$. When $\Delta\theta > 1$, $\varepsilon$ is set to 1 to encourage exploring the unknown parameter space; When both $\Delta\theta$ and the cycle time satisfy the given conditions, $\varepsilon$ is set to 0 to exploit the model to optimize the parameters and the GPR modeling process stops; When the performance degrades (the cycle time increases), $\varepsilon$ is set to 0.5 to restart the optimization process; Otherwise $\varepsilon$ is set to $\Delta\theta$ to balance the exploration and exploitation processes.

EXPERIMENTAL RESULTS

Experiment 1

Experimental Setup

Figure 6:
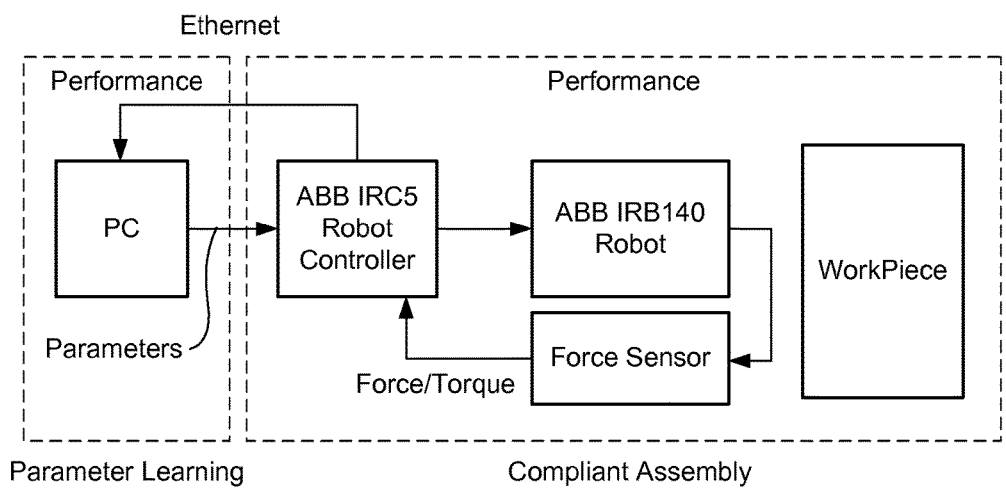
FIG. 6 is a block diagram illustrating one embodiment of an apparatus that can be used for a robotic assembly process with optimization.

Experiments were performed using a high precision valve body assembly process. The experimental system included an ABB IRB140 robot with an IRC5 controller, a force sensor mounted on the robot end effector and a vacuum suction tool used to pick up the valve. The experimental apparatus is shown in FIG. 6. This apparatus may be also be used in a production setting in various embodiments.

A computer was used for offline and online parameter optimization. The computer was connected to the robot controller via Ethernet. An ABB force control package was used to perform the assembly process.

The assembly process included force guided spiral search and force controlled insertion. The following three parameters are considered: Search Speed (SS), Search Force (SF) and Insertion Force (IF). As listed in Table I, three groups of experiments were performed for comparison, where 3P3V refers to three parameters and each parameter has three values; 3PFV refers to three parameters and each parameter has more than three values. In Table I, the experimental system parameters were defined using the format (Minimum Value: Interval: Maximum Value). Hence for the Design-of-Experiment (DOE) 3P3V configuration, the search force parameter has 3 possible values: 250, 300, 350; while for the GPRBOA 3PFV configuration, the search force parameter has 11 possible values from 250 to 350 with step size 10.

TABLE I

PARAMETER CONFIGURATIONS, SS, SF AND IF REPRESENT SEARCH SPEED, SEARCH FORCE AND INSERTION FORCE RESPECTIVELY.

| EXPERIMENTS | SS | SF | IF | Δx | Δy | Δϕ$_x$(°) | Δϕ$_y$(°) | REPEAT TIMES |
|---|---|---|---|---|---|---|---|---|
| DOE 3P3V | 250:50:350 | 5:15:35 | 50:25:100 | −9 ± 1 | ±1 | ±0.6 | ±0.2 | 10 |
| GPRBOA-VR 3P3V | 250:50:350 | 5:15:35 | 50:25:100 | −9 ± 1 | ±1 | ±0.6 | ±0.2 | 2 |
| GPRBOA-VR 3PFV | 250:10:350 | 5:0.5:35 | 50:5:100 | −9 ± 1 | ±1 | ±0.6 | ±0.2 | 2 |

The parameters in the algorithm are chosen as $k_\theta=0.05$, $k_u=0.95$, $k_f=0.75$. From equation (12), we know that the model is converged if $k_\theta$ is close to 0 and the variation of the cycle time is close to ($k_u=0:95$) the current best cycle time. If the variation of the cycle time is larger than one-third of the current best cycle time ($k_f=0.75$), the process parameter optimization should be restarted.

DOE Results

The DOE experiments were performed offline. For the 3P3V configuration, there are $3^3=27$ sets of parameters. Because the cycle time is affected by several random factors, the performance of each set of parameters has to be statistically calculated. Therefore, experiments were performed 10 times for each set of parameters, i.e., totally 270 experiments were conducted. For the robotic assembly process, it is desired that the cycle time and its variance are small. Using the DOE method, the mean cycle time is 2.3 s and variance is 0.09 s.

GPRBOA Results

The GPRBOA experiments were performed online. Each GPRBOA configuration was repeated twice which are denoted as 3P3V #1, 3P3V #2, 3PFV #1 and 3PFV #2 in short. 3P3V #1 and 3P3V #2 have different initial sample points ([350,5,100] and [250,35,50]). After about 10 iterations, the model converged and a set of optimal parameters [350,20,50] were identified.

Compared to the 3P3V configuration, 3PFV GPRBOA splits each parameter more precisely. Thus the underlying relationship between the parameters and the cycle time can be described more accurately. Due to the variation of the assembly process, the derived GPR models in each experiment are not all the same. That is why 3PFV #1 and #2 experiments converged to two sets of parameters [350,24, 50] and [350,23.5,50]. However, because the derived models are similar, the optimal parameters are very close.

Figure 7:
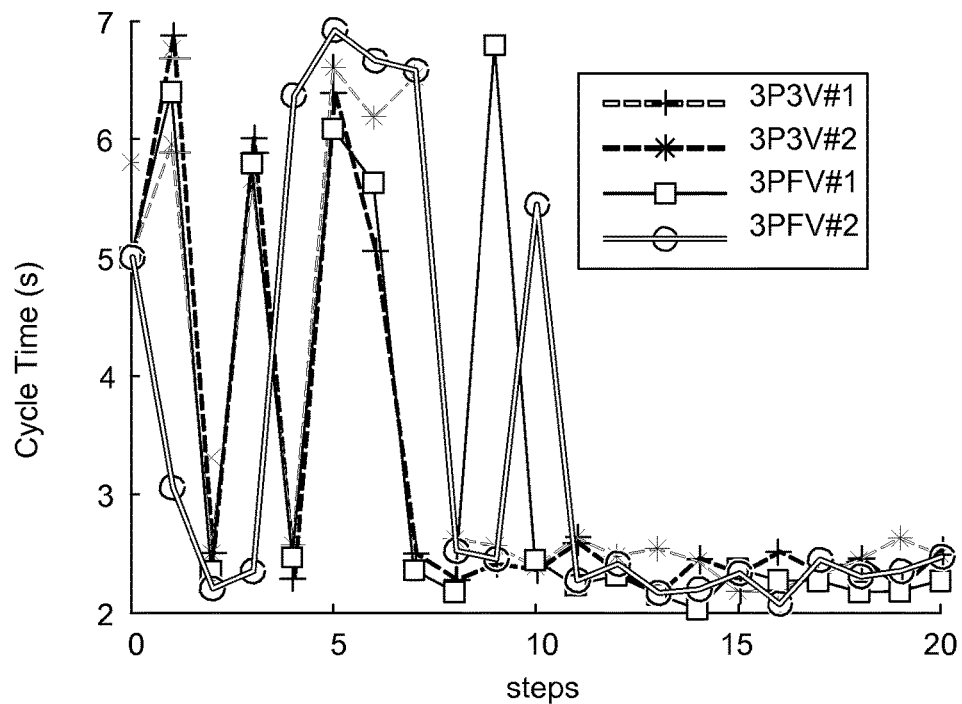
FIG. 7 shows plots of four GPRBOA experiments.

The four GPRBOA experiments are plotted in FIG. 7. Each experiment can be divided into two stages: optimization and production. The optimization stage took about 8 to 11 assemblies. The algorithm explores the parameter space, builds the underlying GPR model and optimizes the parameters online. Once the optimal parameters are found, the system switches to the production stage to perform the assembly process using the identified optimal parameters.

Discussion

1) Efficiency: The DOE method chooses several values for each parameter, tests the parameter combinations by experiments and finds the optimal one among them. Thus the result is not globally optimal. To overcome the variations of the assembly process and obtain stable result, each parameter set has to be tested several times. As the number of parameters and the number of values of each parameter increase, the number of experiments to be performed grows rapidly.

For the GPRBOA method, the number of parameters and the number of values of each parameter do not increase the complexity of the optimization process. From the experimental results shown in FIG. 7, although the parameter combinations increase from 3×3×3=27 to 11×61×11=7381, the number of experiments to identify the optimal parameters does not increase.

By comparing the DOE results to the GPRBOA 3P3V results, it is noted that the GPRBOA method achieves same optimal parameters using 8 experiments instead of 270 experiments using the DOE method. Therefore, in this experiment, the GPRBOA is more efficient than the DOE method.

The optimal parameters, the cycle time (mean and variance) and the corresponding experimental time are listed in Table II. The experimental time is obtained by accumulating the cycle time of each experiment (The data processing time for the DOE method is not considered because it is done offline).

TABLE II

COMPARISON OF EXPERIMENTAL RESULTS.

| Methods | Optimal | $C_t\mu$ (s) | $C_t\sigma$ (s) | Number of Experiments | Total Time (s) |
|---|---|---|---|---|---|
| DOE | [350, 20, 50] | 2.32 | 0.09 | 270 | 1254 |
| 3P3V #1 | [350, 20, 50] | 2.39 | 0.13 | 8 | 36.61 |
| 3P3V #2 | [350, 20, 50] | 2.44 | 0.14 | 13 | 53.7 |
| 3PFV #1 | [350, 24, 50] | 2.31 | 0.14 | 13 | 54.26 |
| 3PFV #2 | [350, 23, 5, 50] | 2.23 | 0.1 | 13 | 52.05 |

From Table II, similar optimal parameters and cycle time are obtained; however, the parameter optimization time is greatly reduced using the GPRBOA method.

Figure 8:
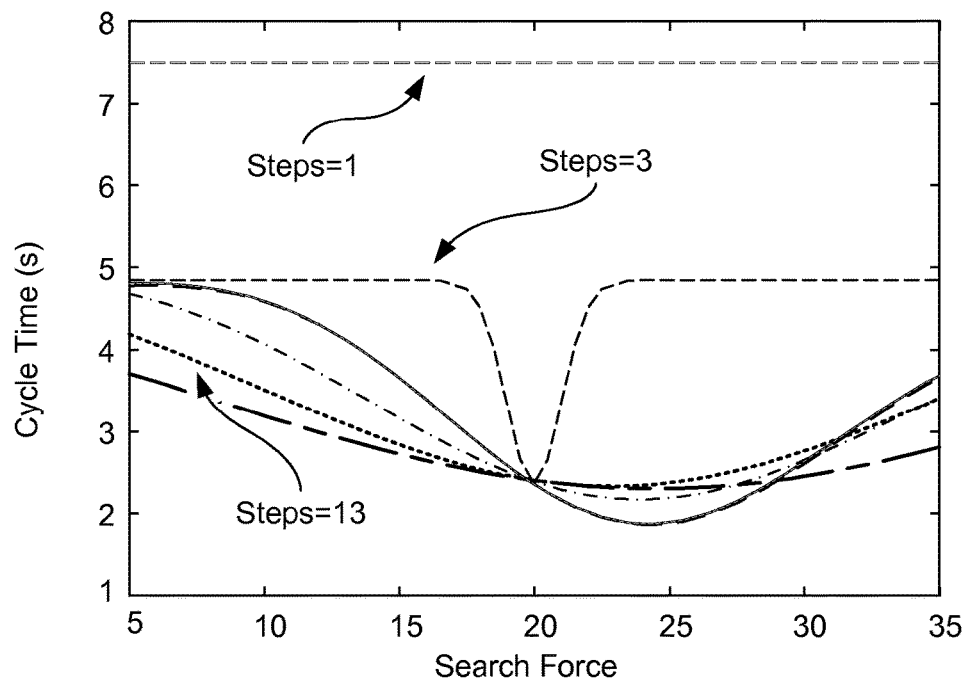
FIG. 8 shows the modeling process of a GPRBOA.

2) Accuracy: From Table II the mean cycle time obtained using GPRBOA 3PFV in this experiment was better than that using DOE method. This is because more values of each parameter can be explored. FIG. 8 shows the modeling process of GPRBOA 3PFV #1 while Search Speed is fixed to be 350 and Insertion Force 50. Hence FIG. 8 shows the relationship between average cycle time and Search Force.

The model is updated during each step with more and more data sets considered. From FIG. 8, the initial model is rough with little useful information. After several iterations, the model converges with a minimal point. In FIG. 8 the minimal point lies between 20 and 25 which cannot be identified using DOE 3P3V.

Figure 9A:
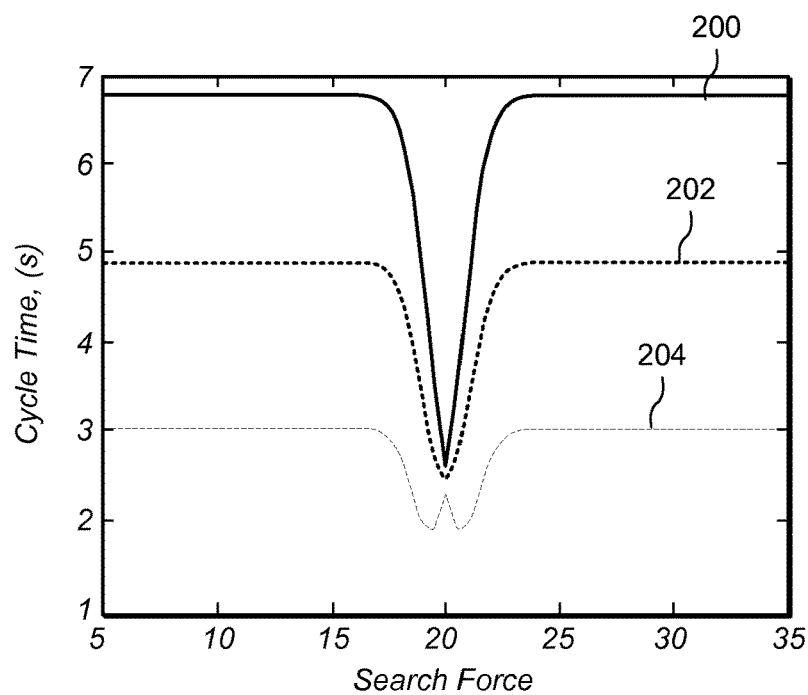
FIG. 9 gives final models for four GPRBOA configurations.
Figure 9B:
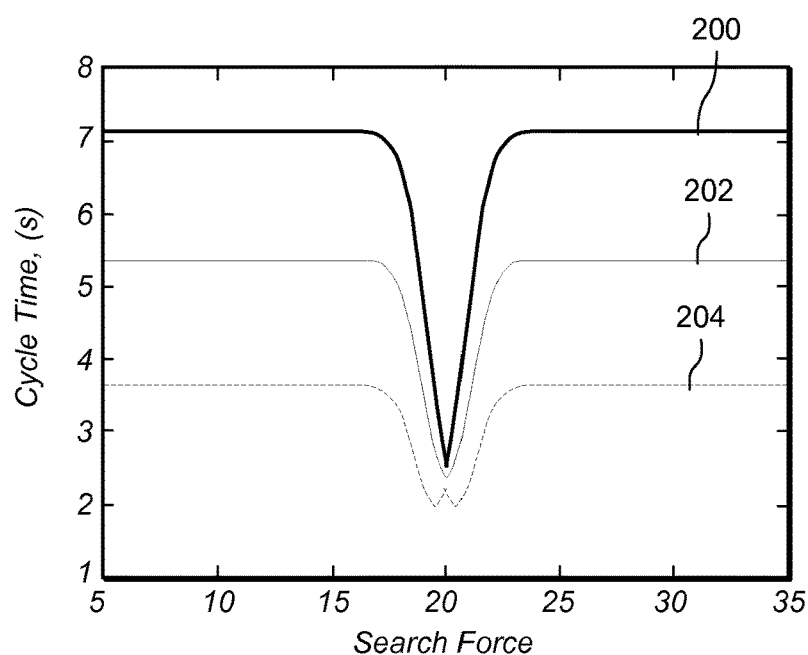
Figure 9C:
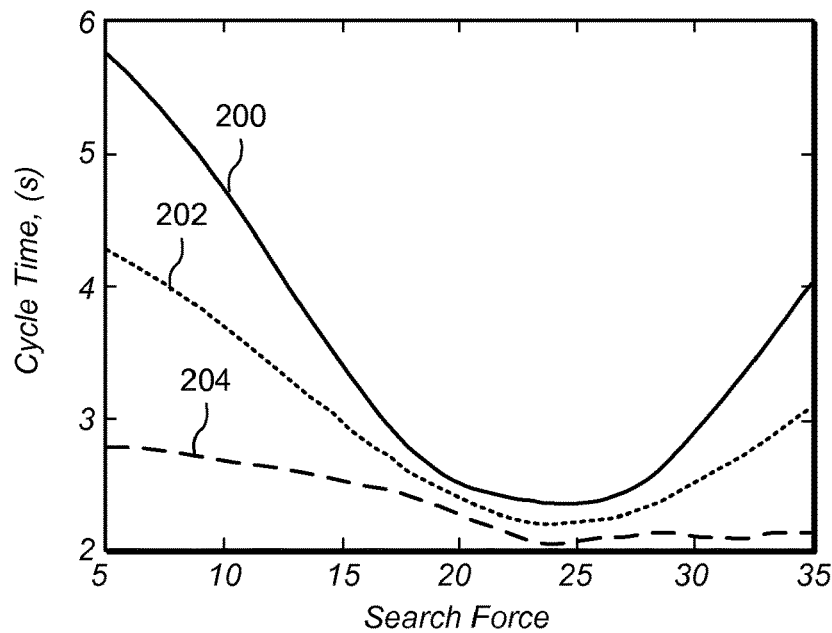
Figure 9D:
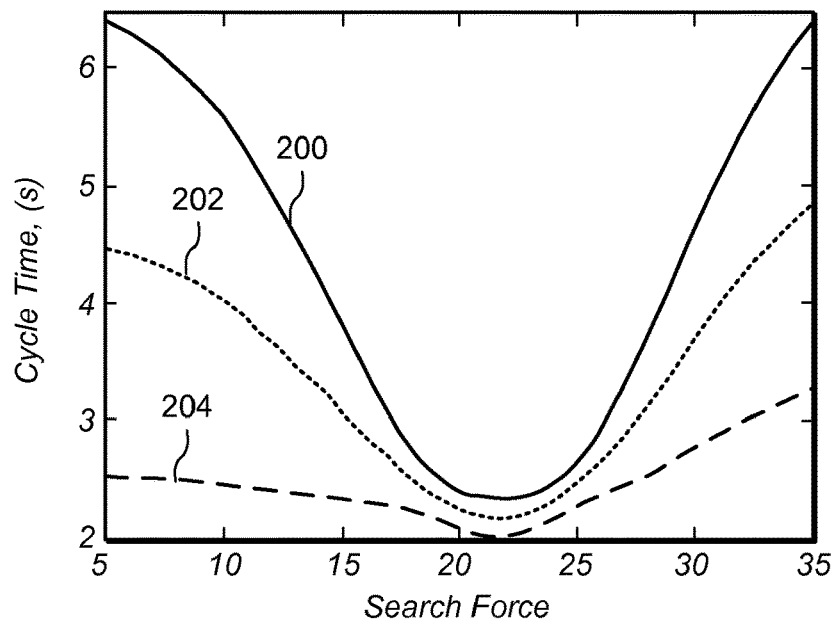

FIGS. 9A through 9D give the final models for the four GPRBOA configurations. FIG. 9A corresponds to 3P3V #1. FIG. 9C corresponds to 3PFV #1. FIG. 9D corresponds to 3PFV #2. FIG. 9A corresponds to 3P3V #1. For each graph, lines 200 and 204 refer to the upper and lower bounds ($\mu\pm\sigma$) of the cycle time and line 202 refers to the mean cycle time values. Compared to the models built for the 3PFV configurations, those for the 3P3V configurations are rough. Because the GPRBOA method can explore the interesting area in detail without worrying about the complexity, it can identify the optimal parameters to achieve improved cycle time.

Experiment 2

A second experiment was conducted including varying parameter spans. The apparatus and procedure were generally similar to that of Experiment 1. Table III summarizes the variations.

TABLE III

| Parameter | Large Span | Medium Span | Small Span |
|---|---|---|---|
| Fi | 50-200 | 50-200 | 100-150 |
| Fs | 5-50 | 10-40 | 10-20 |
| Vs | 150-450 | 200-350 | 250-350 |
| Rs | 1-3 | 1-3 | 1.5-2.5 |

Figure 10:
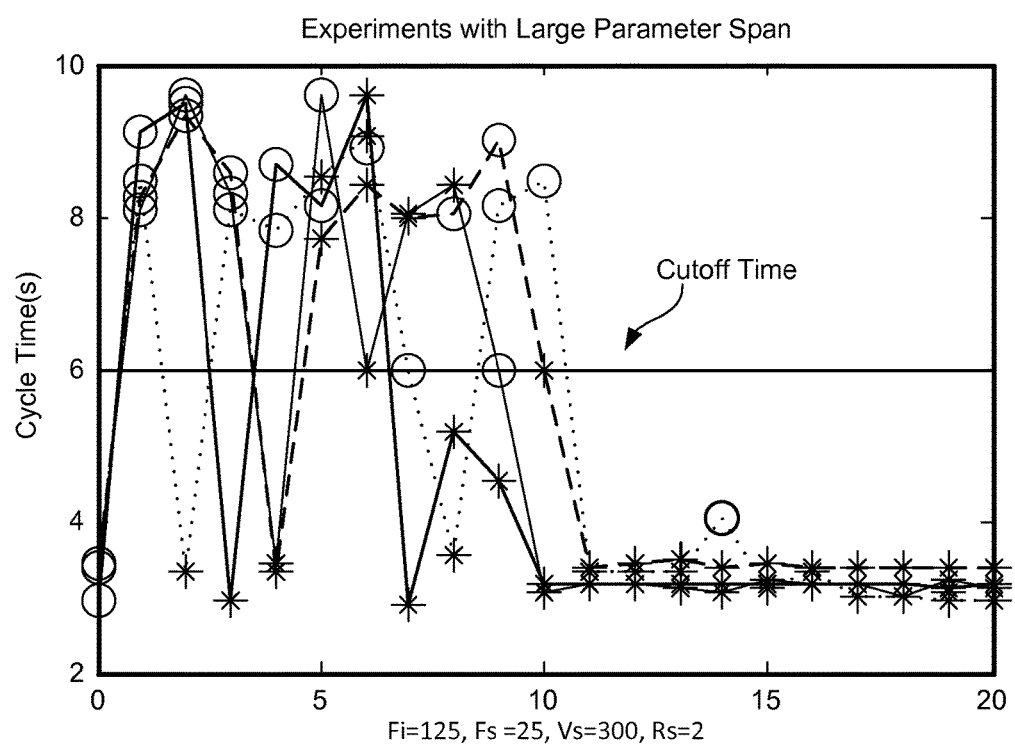
FIG. 10 is a graph showing the results of the experiment with a large parameter span.
Figure 11:
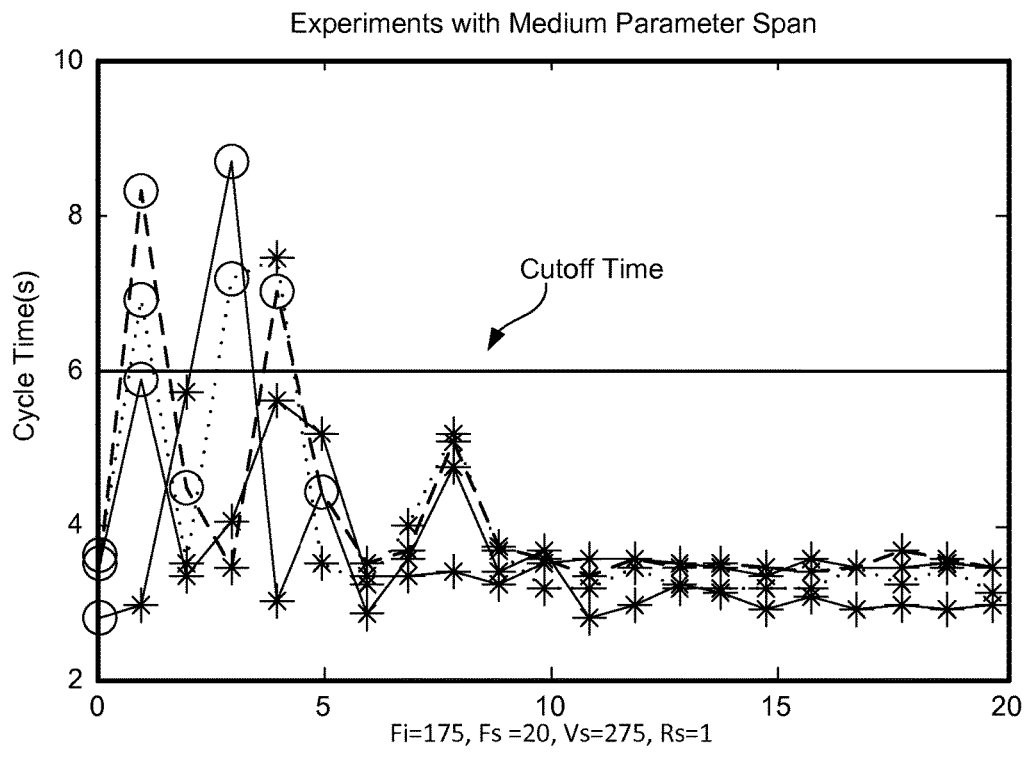
FIG. 11 is a graph showing the results of the experiment with a medium parameter span.
Figure 12:
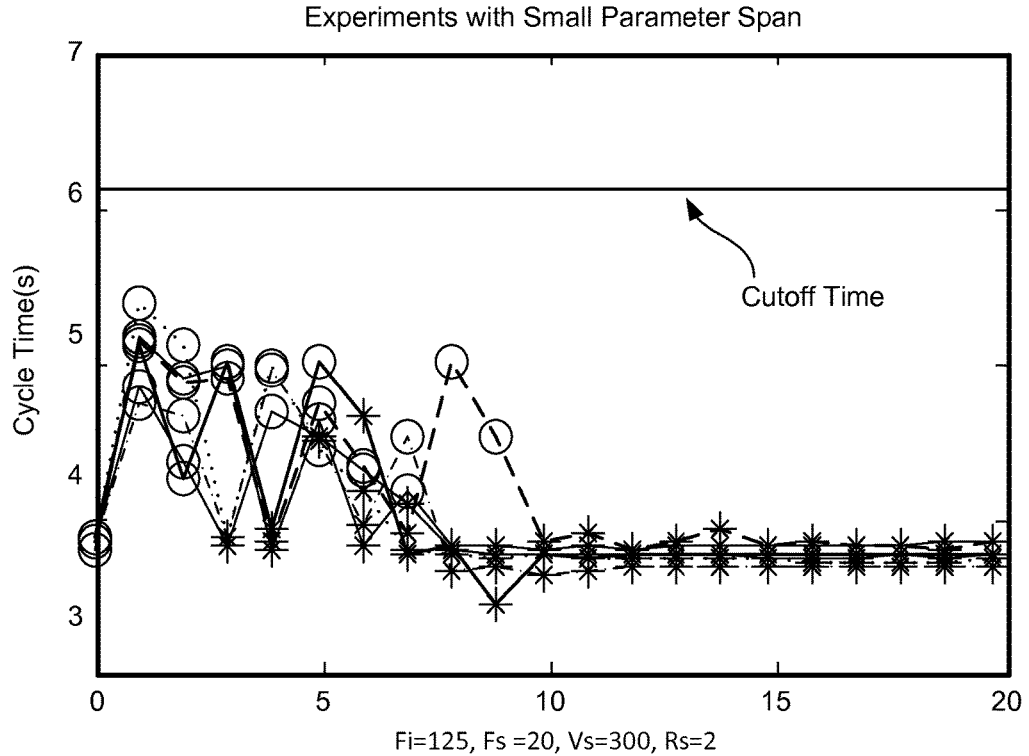
FIG. 12 is a graph showing the results of the experiment with a small parameter span.

FIG. 10 is a graph showing the results of the experiment with a large parameter span. FIG. 11 is a graph showing the results of the experiment with a medium parameter span. FIG. 12 is a graph showing the results of the experiment with a small parameter span.

Figure 13:
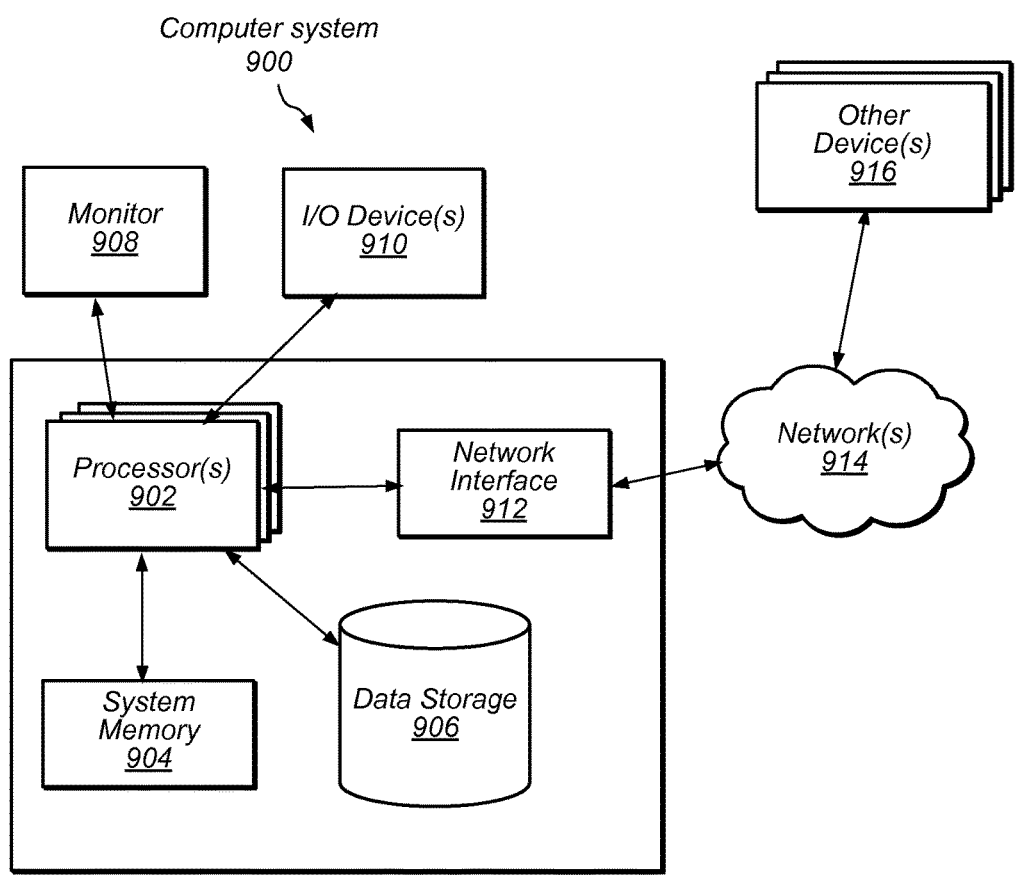
FIG. 13 illustrates a computer system that may be used in various embodiments to implement optimization and control of a manufacturing process.

Methods as described herein may be implemented on one or more computational devices. In some embodiments, the computational device is a computer system. FIG. 13 illustrates a computer system that may be used in various embodiments to implement optimization and control of a manufacturing process as described herein. Computer system 900 includes one or more processors 902, system memory 904, and data storage device 906. Program instructions may be stored on system memory 904. Processors 902 may access program instructions on system memory 904. Processors 902 may access data storage device 906. Users may be provided with information from computer system 900 by way of monitor 908. Users interact with computer system 900 by way of I/O devices 910. An I/O device 910 may be, for example, a keyboard or a mouse. Computer system 900 may include, or connect with, other devices 916. Elements of computer system 900 may connect with other devices 916 by way of network 914 via network interface 912. Network interface 912 may be, for example, a network interface card. In some embodiments, messages are exchanged between computer system 900 and other devices 916, for example, via a transport protocol, such as internet protocol.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

As used herein, "manufacture" includes assemble, welding, fabrication, production, or forming of a part or combination of parts.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method for process parameter optimization in a robotic manufacturing process, comprising:
    identifying, by a computational device, in two or more successive iterations during the robotic manufacturing process, a system model for the robotic manufacturing process; and
    optimizing one or more manufacturing process parameters based on the model identified wherein, for at least one of the iterations, the model is identified through a Gaussian process regression—surrogated Bayesian optimization algorithm, and wherein, for at least one other of the iterations, optimization is performed and applied to the manufacturing process on-line based on the model identified through the Gaussian process regression—surrogated Bayesian optimization algorithm while the manufacturing process is being performed, wherein online parameter optimization through the Gaussian process regression—surrogated Bayesian optimization algorithm comprises adding a random variation factor to a lower confidence bound acquisition function.

2. The method of claim 1, wherein, for at least one of the iterations, optimization is performed and applied to the manufacturing process while the manufacturing process is being performed on-line and without interruption of the manufacturing line.

3. The method of claim 1, wherein the manufacturing process comprises at least one assembly process, wherein optimizing on or more manufacturing process parameters comprises optimization of at least one process parameter for an assembly process.

4. The method of claim 1, further comprising evaluating the manufacturing process, wherein evaluating the manufacturing process comprises performing the robotic manufacturing process using candidate process parameters.

5. The method of claim 4, wherein, for at least one the candidate process parameters the robotic manufacturing process uses for the evaluation of the manufacturing process are generated from the identified model.

6. The method of claim 4, wherein, for at least one the candidate process parameters the robotic manufacturing process uses for the evaluation of the manufacturing process are initial process parameters.

7. The method of claim 4, wherein the robotic manufacturing process is terminated after a pre-determined cut-off time.

8. The method of claim 1, wherein, for at least one of the iterations, identifying the model comprises balancing exploration of a model and exploitation of an identified model.

9. The method of claim 1, further comprising, for at least one of the iterations, determining whether to optimize one of the process parameters or update the model.

10. The method of claim 1, applying a switching criterion to determine whether to optimize one of the process parameters or update the model.

11. The method of claim 1, further comprising, for at least one of the iterations: determining a balance factor; and using the balance factor to determine whether to optimize one of the process parameters or update the model.

12. The method of claim 1, further comprising restarting optimization if there is a disturbance in the manufacturing process.

13. The method of claim 1, further comprising restarting optimization in response to variations in the characteristics of parts being assembled by the robotic manufacturing process.

14. A system, comprising:
a processor;
a memory coupled to the processor, wherein the memory comprises program instructions executable by the processor to implement:
identifying, by a computer system, in two or more successive iterations during a robotic manufacturing process, a system model for the robotic manufacturing process; and
optimizing one or more manufacturing process parameters based on the model identified, wherein, for at least one of the iterations, the model is identified through a Gaussian process regression—surrogated Bayesian optimization algorithm, wherein online parameter optimization through the Gaussian process regression—surrogated Bayesian optimization algorithm comprises adding a random variation factor to a lower confidence bound acquisition function; and
wherein, for at least one other of the iterations, optimization is performed and applied to the manufacturing process on-line based on the model identified through the Gaussian process regression—surrogated Bayesian optimization algorithm while the manufacturing process is being performed.

15. A non-transitory, computer-readable storage medium comprising program instructions stored thereon, wherein the program instructions are configured to implement:
identifying, by a computer system, in two or more successive iterations during a robotic manufacturing process, a system model for the robotic manufacturing process; and
optimizing one or more manufacturing process parameters based on the model identified in the iterations; wherein, for at least one of the iterations, the model is identified through a Gaussian process regression—surrogated Bayesian optimization algorithm, wherein online parameter optimization through the Gaussian process regression—surrogated Bayesian optimization algorithm comprises adding a random variation factor to a lower confidence bound acquisition function; and
wherein, for at least one other of the iterations, optimization is performed and applied to the manufacturing process on-line based on the model identified through the Gaussian process regression—surrogated Bayesian optimization algorithm while the manufacturing process is being performed.

* * * * *